United States Patent
Berenguer

(10) Patent No.: US 7,443,416 B2
(45) Date of Patent: Oct. 28, 2008

(54) VIDEOCONFERENCING SYSTEM FOR AND METHOD OF TELE-WORKING

(75) Inventor: Marc Berenguer, Revel (FR)

(73) Assignee: France Telecom, Paris (FR)

( * ) Notice: Subject to any disclaimer, the term of this patent is extended or adjusted under 35 U.S.C. 154(b) by 447 days.

(21) Appl. No.: 10/502,854

(22) PCT Filed: Dec. 16, 2002

(86) PCT No.: PCT/FR02/04365

§ 371 (c)(1),
(2), (4) Date: Feb. 15, 2005

(87) PCT Pub. No.: WO03/065721

PCT Pub. Date: Aug. 7, 2003

(65) Prior Publication Data

US 2005/0128285 A1 Jun. 16, 2005

(30) Foreign Application Priority Data

Jan. 30, 2002 (FR) ................................. 02 01119

(51) Int. Cl.
H04N 7/15 (2006.01)

(52) U.S. Cl. ................................ 348/14.09; 348/14.08

(58) Field of Classification Search ............. 348/14.09, 348/14.08, 14.07; 370/260, 270
See application file for complete search history.

(56) References Cited

U.S. PATENT DOCUMENTS 6,466,250 B1 * 10/2002 Hein et al. ................ 348/14.09
7,058,168 B1 * 6/2006 Knappe et al. .......... 379/204.01

FOREIGN PATENT DOCUMENTS

WO      WO 95/10157 A    4/1995
WO      WO 97/49244 A    12/1997

* cited by examiner

*Primary Examiner*—Stella L Woo
(74) *Attorney, Agent, or Firm*—Lowe Hauptman Ham & Berner LLP

(57) ABSTRACT

A videoconferencing system breaks the isolation of teleworkers by recreating relational situations between the teleworkers and other employees from the same company as if the parties were conversing in the same office. Each person participating in the videoconferencing always receives animated images of all the other participants via a central server and can select the image of at least one other participant with whom an audioconference, within the videoconference, is to be established. The central server only retransmits audio data from each audioconference participant to the other audio conference participants, with an identifier for each participant.

12 Claims, 5 Drawing Sheets

VIDEOCONFERENCING SYSTEM FOR AND METHOD OF TELE-WORKING

REFERENCE TO RELATED APPLICATIONS

This application is a continuation of the PCT International Application No. PCT/FR02/04365 filed Dec. 16, 2002 m which is based on the French Application No. 02-01119 filed Jan. 30, 2002.

BACKGROUND OF INVENTION

The present invention relates to a videoconference system with videophone terminals and central multipoint means for management of videoconferences connected via a telecommunications network. It relates more particularly to a videoconference between participants of whom some are teleworkers working at respective terminals installed in their homes.

DESCRIPTION OF PRIOR ART

In prior art videoconference systems, pictures of the participants in a videoconference at respective terminals are sometimes forwarded to each terminal in the form of a mosaic of pictures of the participants. However, if there are many participants, only the picture of the active participant who is currently speaking is forwarded to all the terminals by the central means.

With reference to audio signals, the central means either sums all the audio signals from the terminals in order to reproduce the sum of those signals at each terminal, with the exception of the signal coming from it, or detects the terminal with highest voice activity in order to transmit only the audio signal coming from that terminal to the other terminals.

In these prior art videoconference systems, all terminals participating in the videoconference are in audio communication. Forwarding to the terminals either the audio signals from all the other terminals or the audio signal representing the highest voice activity does not reflect situations in which workers in the same business, or more generally participants in the same place, are conversing. For example, in a business group with four participants, two participants may wish to talk without their conversation being heard by the other two persons, one participant may wish to transmit a message to one, two or all three of the other participants, or one participant may wish to intervene in the confidential conversation between two or all three of the other participants.

SUMMARY OF THE INVENTION

The object of the present invention is to recreate the relation conditions between the participants of a business group when at least one of them is at a terminal remote from the rest of the group. More generally, the invention aims to break down the isolation of teleworkers by creating a virtual form of the business group to which they belong around each of them, in the same manner as if they were all in the same office, even if all the participants are in fact working at home. Each participant may then converse with one or more other participants of his choice or even intervene in a discussion between two of the other participants, just as he would if he were working in the same office as the other participants.

Accordingly, a videoconference system comprising terminals connected via a telecommunications network to central videoconference management means that collects video data from participants in at least one videoconference respectively transmitted by the terminals and broadcasts video data transmitted by each terminal to the other terminals, is characterized in that each terminal as a calling terminal comprises selection means for selecting at least one called terminal with which an audiovisual communication is to be set up in order for the calling terminal to transmit a called terminal identifier and calling party audio and video data to the central means, the central means comprises audio-video means for transmitting the calling party audio and video data with the identifiers of the calling and called terminals to the called terminal and for transmitting only the calling party video data with the identifier of the calling terminal to the terminals other than the calling and called terminals, and each terminal as a called terminal comprises control means for controlling reproduction of the calling party audio data forwarded by the central means in matching relationship with the display of pictures representative of the calling party video data transmitted by the central means in response to the identifiers of the calling and called terminals transmitted by the central means.

Unlike prior art videoconference systems, the videoconference system according to the invention does not exchange audio data systematically between the terminals or does not broadcast the audio data of the participant who is currently speaking to the terminals. The central means routes audio data only between terminals that wish to set up an audioconference within the videoconference. On the other hand, as in certain prior art videoconference systems, the central means continuously broadcasts the picture of the participant at each terminal to the other terminals.

For example, if Pierre, Paul, Jacques and Mathieu are participants in a videoconference, each of them sees the picture of the other three on the screen of his terminal, and Pierre and Paul may be conversing, for example, without Jacques and Mathieu being able to hear their conversation; or Mathieu may decide to broadcast a voice message or to converse with the other three participants Pierre, Paul and Jacques, for example to take a vote, without Pierre, Paul and Jacques being able to converse with each other; or, to give a further example, Jacques may intervene in the conversation between Pierre and Paul if the latter accept this intervention. The videoconference system according to the invention therefore reproduces the various working relationships between the four participants, despite the distance between them.

According another feature of the videoconference system according the invention, each terminal as a called terminal comprises means for transmitting a call confirmation with an identifier of the called terminal and the called party audio and video data to the central means, and the central means comprise memory means for establishing a matching relationship between the identifier of the called terminal and the identifier of the calling terminal and vice-versa in order to set up bidirectional audiovisual communication between said calling and called terminals.

In order for each participant at a terminal to be able to listen selectively to the voices of the other participants with whom he is conversing, each terminal comprises means for mixing audio data transmitted selectively by other terminals in audiovisual communication with said each terminal.

According another advantageous feature of the invention, the selection means of each terminal marks on a screen of the terminal the picture and/or the identifier of each participant whose terminal is in audiovisual communication with said each terminal. This display or this marking calls the attention of the participant at the terminal to the pictures of the other participants with whom he is conversing as if they were in front of him, in the same place.

The invention relates also to a central server in a videoconference system according the present invention. More precisely the central server is characterized in that it comprises audio-video means for transmitting the audio and video data from a calling terminal which has selected at least one called terminal with which audiovisual communication is to be set up, with identifiers of the calling and called terminals to the called terminal, and transmitting only the calling person video data with the identifier of the calling terminal to terminals other than the called and calling terminals in response to the identifiers of the calling and called terminals transmitted by the calling terminal.

The invention relates still to a videophone terminal for a videoconference system according the present invention. More particularly the terminal is characterized in that it comprises selection means for selecting among said terminals at least one called terminal with which audiovisual communication is to be set up in order for said terminal to transmit an identifier of the called terminal and calling party audio and video data to the central means, and control means for controlling reproduction of audio data of a calling terminal forwarded by the central means in matching relationship with the display of pictures representative of calling party video data forwarded by the central means in response to the identifiers of said terminal and the calling terminal transmitted by the central means.

BRIEF DESCRIPTION OF THE DRAWING

Other features and advantages of the present invention will become more clearly apparent on reading the following description of a plurality of preferred embodiments of the invention, which is given with reference to the corresponding appended drawings, in which.

DETAILED DESCRIPTION OF THE DRAWING

Figure 1:
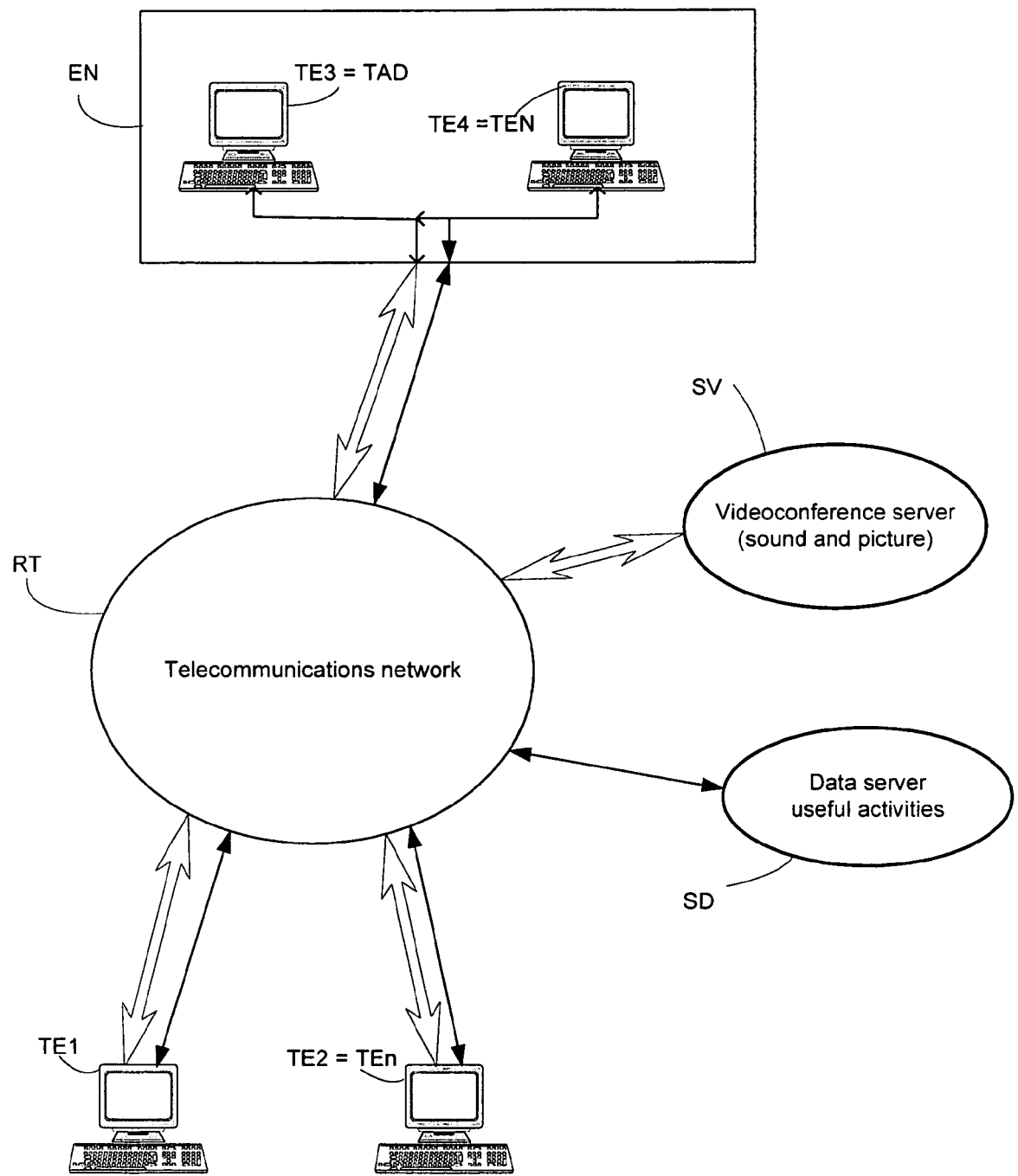
FIG. 1 is a block schematic of a videoconference system according to the invention.

Referring to FIG. 1, a videoconference system according to the invention essentially comprises videophone terminals TE1 to TEN, a central videoconference server SV, and an useful activity data server SD, all of which are connected via a telecommunications network RT. To avoid overcomplicating FIG. 1, only four video terminals TE1, TE2=TEn, TE3=TAD and TE4=TEN are shown. For example, the terminals TE1 and TE2 are installed in the homes of teleworkers and the terminals TE3 and TE4 are installed on the premises of a business EN for which the two teleworkers work.

The central videoconference server SV serves as a videoconference bridge for collecting and distributing video and audio signals between the terminals TE1 to TEN and selectively setting up audioconferences between a few of these terminals. The data server SD manages data useful for the activities common to the participants to the videoconference at the terminals TE1 to TEN.

The servers SD and SV are generally connected to the terminals via the telecommunications network RT. The servers SD and SV may nevertheless be included in the business EN and be connected to the terminals TE3 and TE4 via an intranet and to the terminals TE1 and TE2 via the telecommunications network RT. For example, the telecommunications network is an integrated services digital network ISDN which is connected to the terminals by basic rate access telecommunication lines each comprising two B data channels and to the servers SV and SD by primary rate access lines each comprising 30 B data channels. In another variant, the telecommunications network RT contains a packet transmission network of ATM (Asynchronous Transfer Mode) type or a network of ATM/IP (Internet Protocol) type.

In a further variant, the servers SV and SD are combined in a single central videoconference server managing video signals, audio signals and activity data together.

Although the following description refers to a videoconference created between the terminals TE1 to TE4=TEN shown in FIG. 1, the servers SV and SD may manage a plurality of videoconferences simultaneously for a plurality of separate groups of terminals, not shown.

Figure 2:
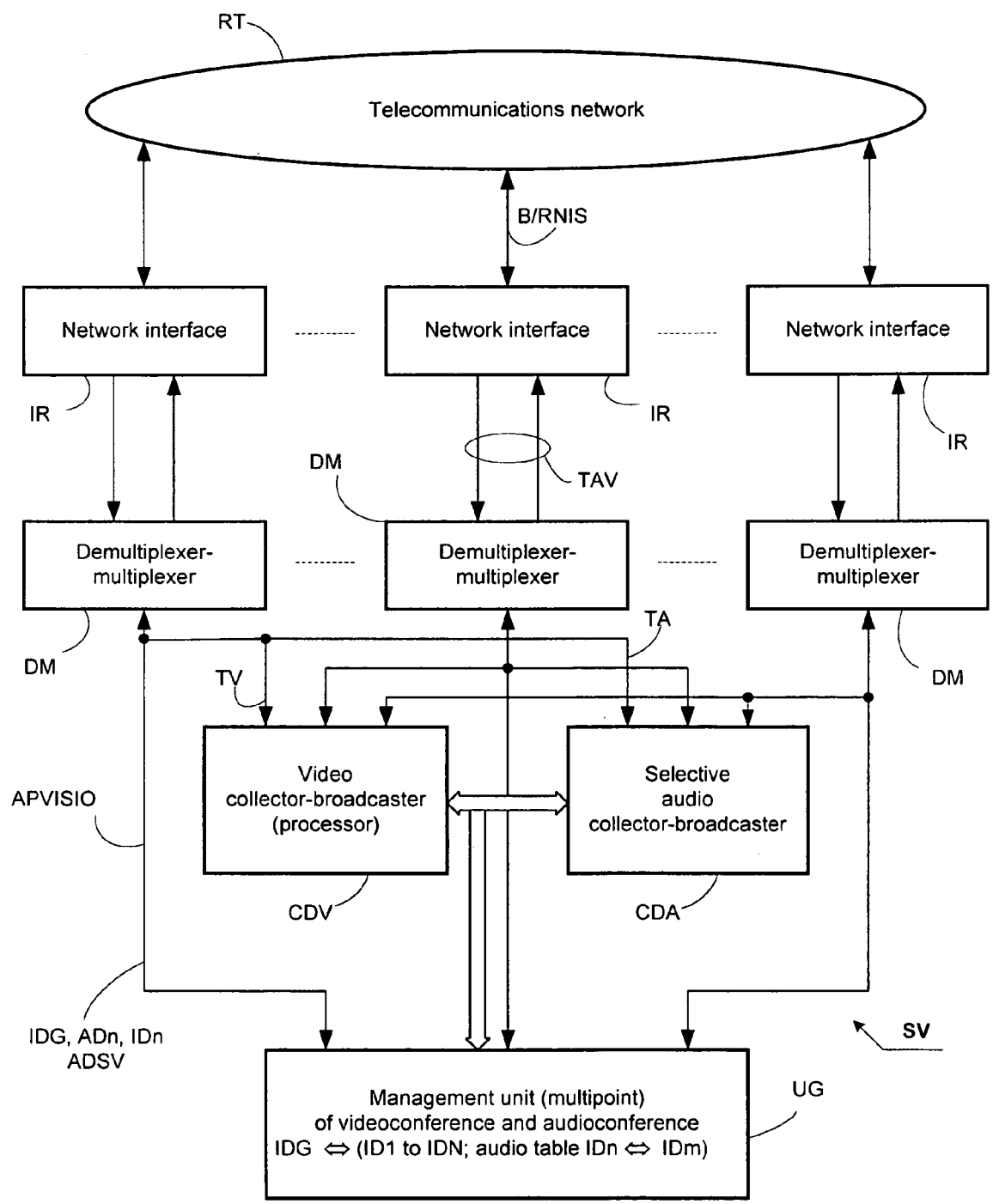
FIG. 2 is a block schematic of a central videoconference server according to the invention.

In a preferred embodiment, the central videoconference server SV shown in FIG. 2 comprises a plurality of network interfaces IR, a plurality of demultiplexers-multiplexers DM connected to respective interfaces IR, and a video collector-broadcaster CDV and a selective audio collector-broadcaster CDA respectively connected by bidirectional video and audio channels to the demultiplexers-multiplexers DM. A management unit UG is connected to the aforementioned circuits in the server SV and manages each videoconference and each audioconference and in particular the setting up of audio calls between terminals participating in a videoconference as well as video and audio data exchanged between the terminals.

The network interfaces IR are each connected to the telecommunications network RT via an ISDN basic rate or primary rate access line, for example. The interfaces adapt messages exchanged between the server SV and the terminals. The messages consist mainly of a source address and a destination address, which may be the address ASV of the server SV, the identifier IDn of a terminal TEn, which may correspond to a telephone number or to a URL (uniform resource locator) address, possibly associated with a participant name, data concerning the status of a call relating to a connection request, for example, a download, a call, a call confirmation or a call clearing down, and video data TVn as such or audiovisual data TAVn as such. The video data TVn corresponds to a digitized and compressed video frame and the data TAVn corresponds to a frame with the component video and audio signals of an animated audiovisual signal.

The demultiplexers-multiplexers DM demultiplex the video frames transmitted by the terminals in order for the video collector-broadcaster CDV to collect video frames TV representing animated pictures of the participants in a videoconference and broadcast them to the terminals via the demultiplexers-multiplexers DM. Thus the animated pictures of all the participants in a videoconference are collected by the collector-broadcaster CDV and the picture of each participant is broadcast to all the terminals participating in the videoconference, except for the terminal of that participant himself. As will emerge later, the pictures of the participants are collected and broadcast continuously once the videoconference has been set up.

The demultiplexers-multiplexers DM also transmit audio frames TA extracted from the audiovisual frames TAV to the collector-broadcaster CDA. However, according to the invention, during a videoconference, only some of the terminals exchange audio frames, as a function of audio calls set up between certain participants, thus forming one or more audioconferences set up during the videoconference. The selective audio collector-broadcaster CDA collects all the audio frames TA produced by demultiplexing the audiovisual frames TAV and broadcasts them only to the terminals indicated by the recipient address or recipient addresses contained in the messages respectively including the audiovisual frames TAV.

The management unit UG processes the addresses and identifiers in the messages received in order to route the video frames TV and the audiovisual frames TAV selectively to the destination terminals. The management unit UG also creates a videoconference by determining with an administrator AD an identifier IDG for a group of videoconference participants and identifiers ID1 to IDN for the participating terminals, and by downloading a videoconference application APVISIO into the terminals participating in the videoconference. The administrator is generally a participant at a terminal, as indicated by the terminal TAD=TE3 in FIG. 1, which is located on the premises of the business EN. The administrator may nevertheless be connected to the operator of the telecommunications network RT and be working at the server SV if the latter is external to the business EN.

The management unit UG is of the multipoint processor type, while the video collector-broadcaster CDV and the selective audio collector-broadcaster CDA are processors respectively dedicated to processing video signals and audio signals.

Figure 3:
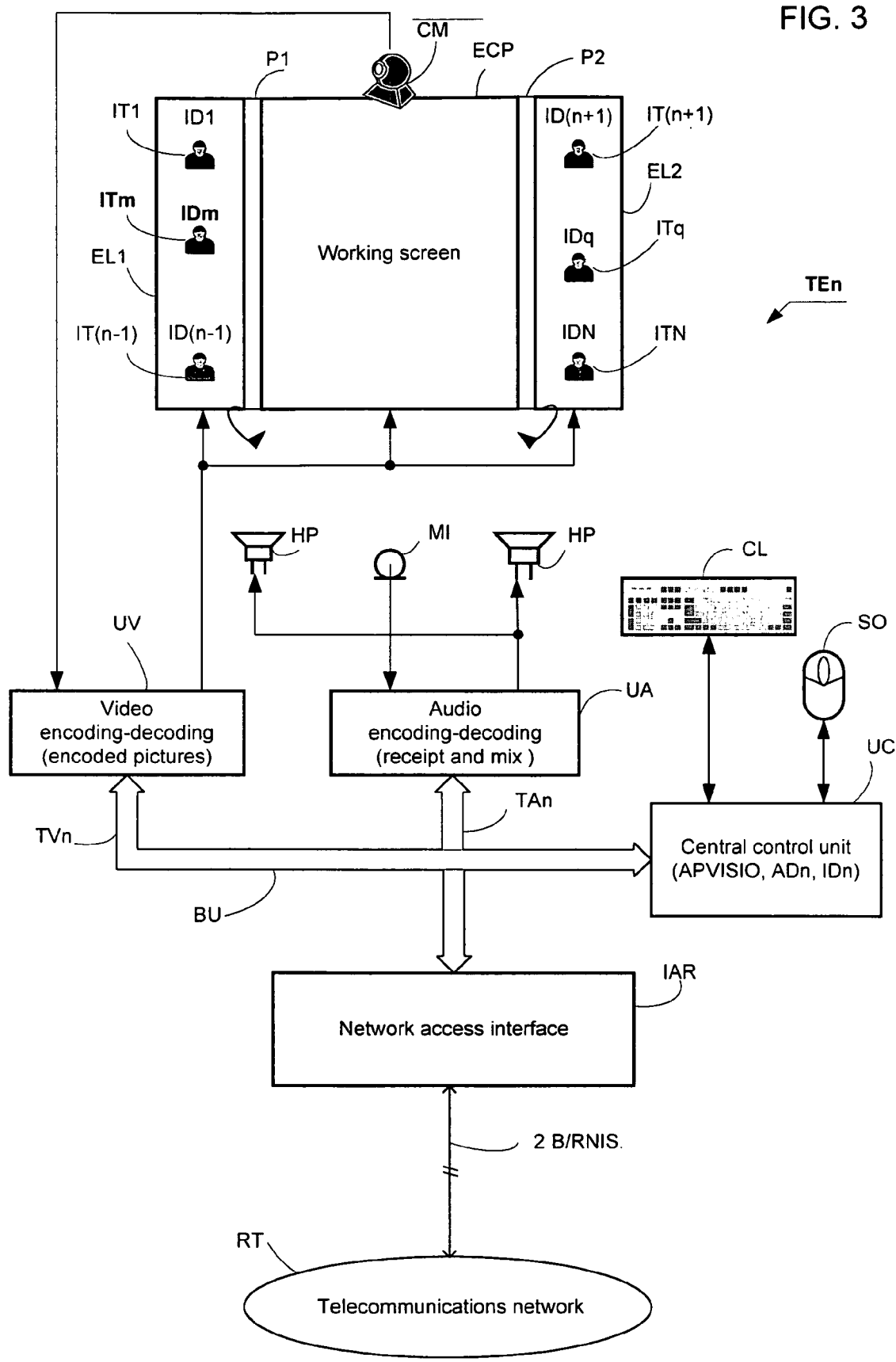
FIG. 3 is a block schematic of a videophone terminal according to the invention.

Each videoconference terminal TEn, where $1 \leq n \leq N$, comprises a personal computer PC capable of multitasking, in particular for exchanging activity data with other terminals via the data server SD while participating in a videoconference with the other terminals TE1 to TEN and displaying the N−1 pictures of the other participants. As shown in FIG. 3, the terminal TEn comprises, from a functional point of view and in relation to the invention, an interface IAR for access to the telecommunications network RT, for example via a basic rate access line comprising two B channels, a video encoding-decoding unit UV, an audio encoding-decoding unit UA, and a central control unit UC that are connected by a data, address and control bus BU. The central control unit UC conventionally comprises a computer central processor unit, memories and a hard disk drive and is connected to a keyboard CL and where appropriate to a mouse SO.

Under the control of the central unit UC, the interface IAR distributes the video and audio data in the video frames TV1 to TV(n−1) and TV(n+1) to TVN transmitted by the other terminals TE1 to TE(n−1) and TE(n+1) to TEN participating in the videoconference via the server SV to the video unit UV in order to display on the screens of the terminals the pictures of the N−1 other participants.

In a preferred embodiment shown in FIG. 3, the screen of the terminal TEn comprises a conventional central main screen ECP and two small flat screens EL1 and EL2 attached laterally to the central screen ECP and connected to the universal serial bus (USB) port of the terminal. The main screen ECP is a working screen for displaying activity data exchanged with the other terminals via the data server SD and the video unit UV in the terminal TEn. Each lateral screen EL1, EL2 may view up to around half of the pictures IT1 to ITN corresponding to the participants in a videoconference working at the other terminals TE1 to TEN.

To facilitate installation of each of the flat rectangular screens EL1, EL2 beside the main screen ECP of a standard computer monitor, each lateral screen EL1, EL2 is pivotably mounted by means of two articulation lugs P1, P2 which are self-adhesive so that they can be fixed to the top and the bottom of one side of the main screen ECP. If the terminal TEN is not being used, the pairs of lugs P1 and P2 enable the screens EL1 and EL2 to be folded back against the main screen ECP.

The screens EL1 and EL2 are preferably touch-sensitive for selecting with the tip of a stylus or a finger the picture ITI to ITN or the identifier IDI to IDN of the participant or participants with whom the participant working at the terminal TEn wishes to converse, and therefore to set up audiovisual communication with that person. The selection of a picture ITm, or an identifier 1Dm, with $m \neq n$, of any participant may also be effected by means of the keyboard CL or the mouse SO, via the videoconference application software APVISIO installed in the control unit UC so that each picture displayed on the screens ECP, EL1 and EL2 is able to overflow onto the lateral screens EL1 and EL2.

Alternatively, if the main screen ECP is large enough, two vertical strips of pictures of participants are embedded laterally to provide a central image area for displaying activity data.

A miniature CCD (Charge Coupled Device) digital video camera CM is connected to the video encoding-decoding unit UV and is placed over the main screen ECP, for example on an extension of the top lug P2, to capture the animated picture ITn of the participant working at the terminal TEn. The frames TVn of the animated picture ITn are transmitted via the unit UV and the interface IAR to the videoconference server SV in order for it to broadcast them to the other terminals TE1 to TE(N−1) and TE(n+1) to TEN participating in the videoconference.

The voice of the participant at the terminal TEn is picked up by a microphone MI or by a set of microphones constituting an acoustic antenna and digitized in the audio unit UA to form "audio" frames TAn that are mixed with video frames TVn transmitted over the interface IAR by the unit UV, which transmits audiovisual frames TAVn to the server SV. As explained later, each audiovisual frame TAVn transmitted by the terminal TEn is accompanied by one or more destination addresses relating to participants in the videoconference whose pictures have been selected on the lateral screens EL1 and EL2 and with whom the participant working at the terminal TEn wishes to converse. Furthermore, the application APVISIO allows an icon to be selected on the screen ECP in order to disconnect the microphone MI temporarily from the audio unit UA to preserve the confidentiality of certain activities in the home of the teleworking participant.

In the receive direction, the audio unit UA receives and mixes demultiplexed audio frames in the frames received via the interface IAR and transmitted by the speaking participants in order to reproduce an audio signal via one or more loudspeakers HP.

In other variants, the terminal TEn is a portable terminal connected to a telecommunications network RT via a prior art access network such as a GSM or UMTS cellular mobile telephone network or a local radio telephone network of Bluetooth. type. In these variants, the terminal may be provided with an additional electrical power supply for the lateral screens EL1 and EL2, which are removable and may be folded back compactly against the main screen ECP.

Figure 4:
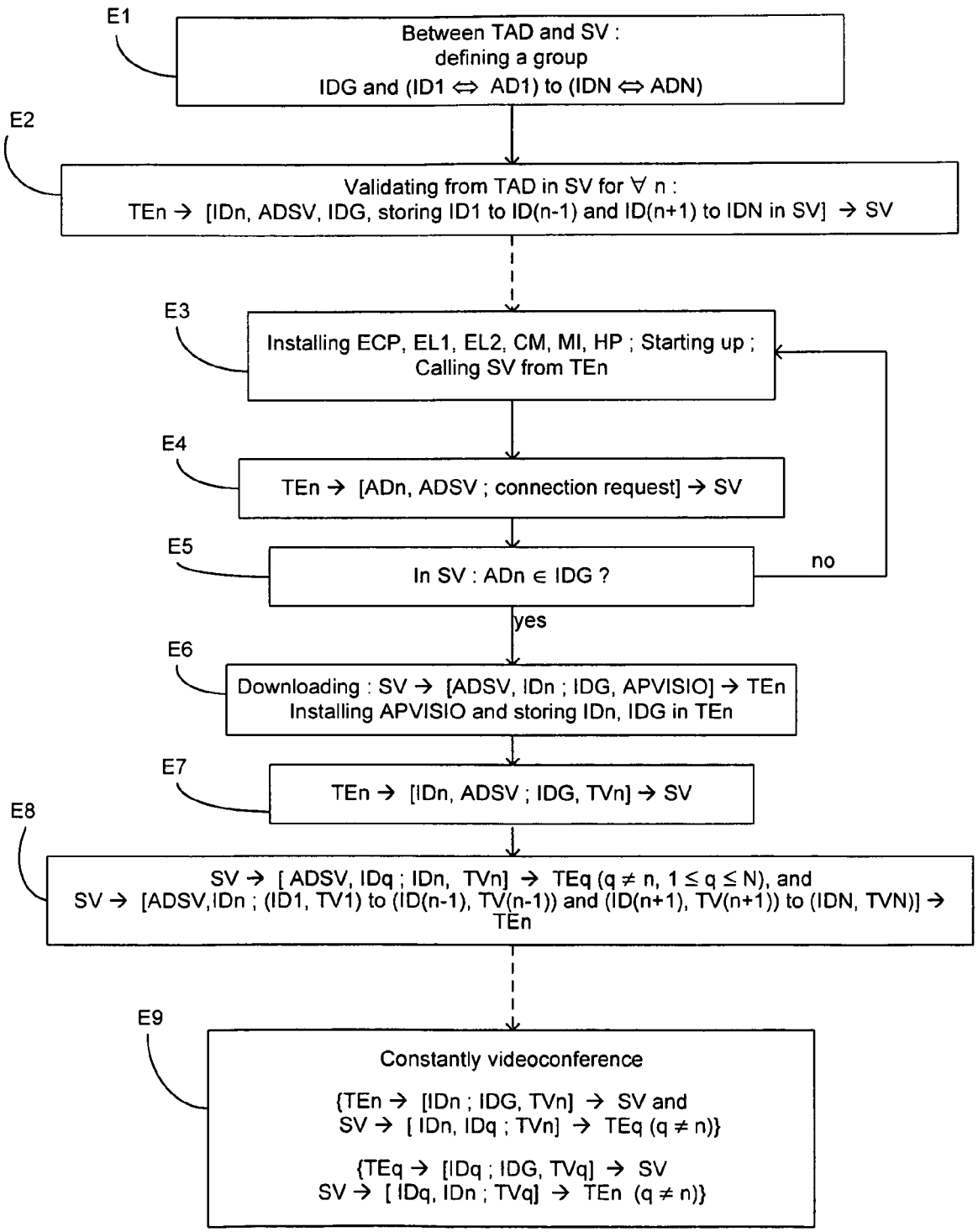
FIG. 4 depicts a videoconference set-up algorithm used in the videoconference system shown in FIG. 1.

To define the main parameters of a videoconference initialized by an administrator at any terminal TAD, for example the terminal TE3 located on the premises of the business EN shown in FIG. 1, a dialog by means of HTML forms is set up between the terminal TAD and the videoconference server SV in the step E1, as shown in FIG. 4. The server SV assigns to the videoconference to be set up a participant group identifier IDG for distinguishing message transmitted by the terminals participating in the videoconference from messages transmitted by terminals participating in other videoconferences managed by the server SV.

The server SV then prompts the terminal TAD to give it at least the addresses AD1 to ADN of the terminals TE1 to TEN participating in the videoconference to be set up. An address ADn of a terminal TEn may be a telephone number or a URL. To facilitate the designation of the terminals TE1 to TEN in association with the pictures of the participants IT1 to ITN, the name and/or the forename is associated with the address of the terminal. Hereinafter, ID1 to IDN denote the identifiers of terminals TE1 to TEN participating the videoconference IDG to be set up, each identifier IDn comprising at least the address ADn and where applicable the name and/or the forename of the participant, for example.

After listing the identifiers ID1 to IDN, the administrator validates the list of identifiers IDI to IDN in step E2 and inserts it into a message whose source address is the identifier IDn and whose destination address is the address ADSV of the server SV. The management unit UG in the server SV stores the list of terminal identifiers ID1 to IDN in matching relationship with the videoconference identifier IDG in order in particular to control the broadcasting of the video frames of the picture of each participant to the terminals of the other participants in the videoconference.

The subsequent steps E3 to E8 of FIG. 4 depict the introduction of a terminal TEn into the videoconference designated by the identifier IDG.

In the step E3, after starting up the terminal TEn, and in particular after installing the screens ECP, EL1 and EL2, the video camera CM, the microphone MI, and at least one loudspeaker HP, the terminal TEn calls the server SV by transmitting a connection request message containing the address ADn of the terminal TEn as the source address and the address ADSV of the vi server SV as the destination address. If terminals do not call the server SV, it may be used to perform local tasks. In response to the connection request message transmitted by the terminal TEn, in the step E4, one of the demultiplexers-multiplexers DM routes the address ADn to the management unit UG in the server SV. In the step E5, the unit UG verifies that the address ADn belongs to a list of identifiers associated with the identifier IDG of a videoconference that has already been set up. If the address ADn is not in any list of identifiers stored in the unit UG, the server SV refuses to insert the terminal TEn into a videoconference that has already been set up.

On the other hand, if the address ADn is recognized in the list of identifiers ID 1 to IDN relating to a videoconference IDG that has already been set up, the management unit tJG downloads the videoconference application APVISIO into the terminal TEn in the step E6, and the application is installed primarily in the central unit UC of the terminal TEn. The identifier IDn is stored in the central unit UC in order to use it as source address for messages to be transmitted to the server SV and as destination address for detecting messages transmitted by the server SV to the terminal TEn.

Following installation of the application APVISIO in the terminal TEn, the latter automatically and continuously transmits messages each containing data consisting of the identifier IDG, the identifier IDn and the address ADSV of the server SV as source and destination addresses, and a video frame TVn representative of the animated picture of the participant in front of the video camera CM of the terminal TEn, in the step E7. In response to the first video frame TVn transmitted from the terminal TEn, the management unit UG in the server SV controls broadcasting of the frame TVn and the identifier IDn of the terminal TEn from the video collector-broadcaster CDV to all the terminals TEq that are already participating in the videoconference IDG, where q≠n and 1≦q≦N, as indicated in the step E8. Also, the server SV forwards the video frames TV1 to TV(n−1) and TV(n+1) to TVN and the respective identifiers IDI to ID(n−1) and ID(n+1) to IDN coming from the other terminals participating in the videoconference to the terminal TEn. The video encoding-decoding unit UV then displays the pictures IT1 to IT(n−1) and IT(n+1) to ITN of the other participants in the videoconference IDG, with the exception of the picture ITn.

As indicated more generally in the step E9, by now excepting the address ADSV of the server SV as a source or destination address in the messages, after inserting all of the terminals TEI to TEN into the videoconference designated by the identifier IDG, each terminal TEn, TEq constantly transmits video frames TVn, TVq associated with the videoconference identifier IDG but without associating them with destination terminal identifiers to the central videoconference server SV whose video collector-broadcaster CDV broadcasts them to the other terminals participating in the videoconference. It will be noted that, at this stage, compared to prior art videoconference systems, no audio signal is exchanged between the terminals and in particular no audio signal is transmitted by the terminal TEn if its participant has not selected the picture ITm of another participant in the videoconference on the screens EL1 and EL2, where m≠n and 1≦m≦N.

Figure 5:
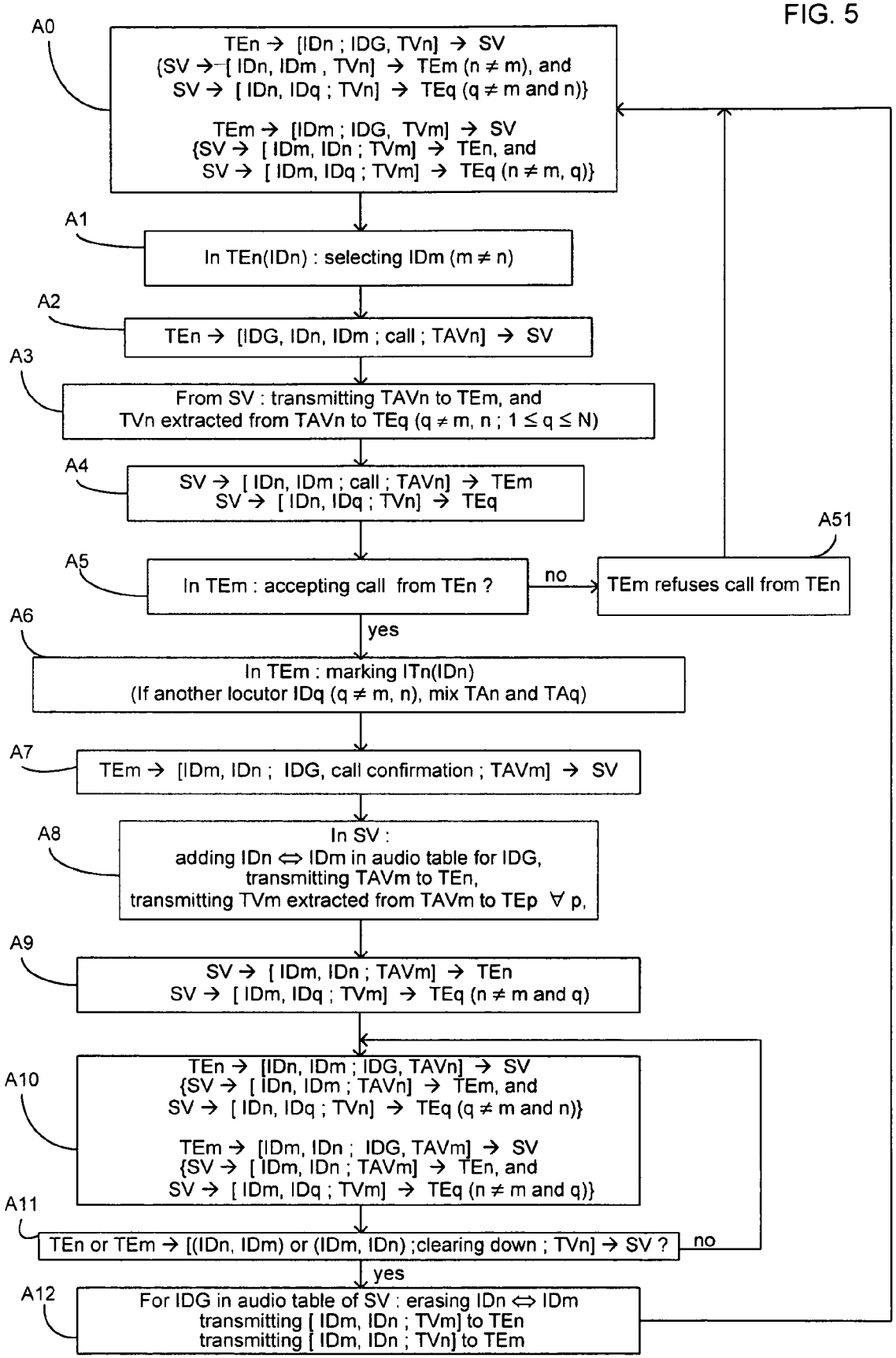
FIG. 5 depicts an audioconference algorithm used in a videoconference set up in accordance with the invention.

FIG. 5 shows steps A0 to A12 of an elementary audioconference set up within the videoconference IDG between the terminals TEI to TEN. It is assumed that this audioconference is initiated from the terminal TEn as a calling terminal in order to call another terminal TEm as a called terminal, which may already be engaged in an audioconference with another terminal TEq. Accordingly, as initially indicated in the step A0, all of the terminals TEn, TEm, TEq transmit video frames TVn, TVm, TVq to the other terminals participating in the videoconference via the server SV so that each participant is able to view the picture of each other participant on the screens EL1 and EL2 of his terminal.

If the calling party working at the terminal TEn wishes to set up a conversation with the called party working at the terminal TEm, he selects the picture ITm of the called party on the screens EL1 and EL2 in the step A1, thereby simulating an off-hook condition in the calling terminal TEn. The selection of the picture of the called party ITm by means of the keyboard CL or the mouse SO, or directly if the screen EL1, EL2 is touch-sensitive, is confirmed by the central processor unit UC, for example by outlining the picture ITm or by highlighting the called party identifier 1 Dm with an appropriate color.

In the subsequent steps A2, A3 and A4, the terminal TEn initiates a call to the terminal TEm by transmitting call data in a message also containing an audiovisual frame TAVn which is the result of mixing in the terminal TEn video signals and where applicable audio signals transmitted by the units UV and UA. The server SV extracts from the received frame TAVn a video frame TVn that is broadcast by the video collector-broadcaster CDV to the other terminals, with the exception of the terminal TEm. In the steps A3 and A4, the server SV transmits the received audiovisual frame TAVn only the called terminal TEm selected in the terminal TEn. The message transmitted by the server SV to the called terminal TEm also contains the call data transmitted by the calling terminal TEn and the identifiers IDn and IDm specifying the source and the destination of the message.

In the step A5, the central control unit UC in the called terminal TEm examines the received message in order to advise the called party working at the terminal TEm that the calling party working at the terminal TEn wishes to speak to him. This is reflected, in the step A6, by placing a thick line border around the picture of the calling party ITn on the screen EL1, EL2 of the terminal TEm, or by marking the calling party identifier IDn on the screen, or by means of a synthesized message reproduced by the loudspeakers HP, for example. If the called party refuses to take the call from the terminal TEn by selecting the picture of the calling party ITn by means of the keyboard CL or the mouse SO or by touching the screen EL1, EL2, the terminal TEm cancels the marking of the picture ITn or the identifier IDn. Alternatively, in the step A51, the called terminal TEm transmits a refusal message containing call refusal data with a video frame TVm to the server SV, which also confirms this refusal to the calling terminal TEn by transmitting it refusal data that automatically cancels the marking of the picture ITm or the identifier IDm on the screen of the terminal TEn. Otherwise, the central unit UC of the called terminal TEm accepts the audio data of the frame TAVn and subsequent frames TAVn and reproduces them via the loudspeakers HP.

As also indicated in the step A6, and where appropriate, the audio encoding-decoding unit UA in the called terminal TEm mixes the frame TAn extracted from the received audiovisual frame TAVn with an audio frame TAq received from at least one other participant with whom the called participant working at the terminal TEm was already conversing prior to the step A6. In this case, the participant working at the terminal TEm speaks to the participants working at the terminals TEn and TEq at the same time, without the latter being able to speak to each other directly. This simulates a real life situation in which two employees of the business are conversing when a third wishes to converse with one of the first two.

In the next step A7, the control unit UC in the called terminal Tem transmits the server SV a message containing call confirmation data and an audiovisual frame TAVm representative of the picture and the voice of the called party in front of the video camera CM and the microphone MI of the terminal TEm. In the step A8, in response to the call confirmation message, the server SV adds the matching relationship of the identifiers IDn and IDm to an audioconference table for the videoconference IDG. Thanks to this matching relationship, the audiovisual frames TAVn and TAVm are exchanged only between the calling and called terminals TEn and TEm. Accordingly, in the step A9, the server SV transmits the audiovisual frame TAVm only in a message addressed to the calling terminal TEn that is conversing with the called terminal TEm and transmits only video frames TVm to all of the terminals TEq with the exception of the terminals TEn and TEm.

In the step A10, the server SV continues to collect video frames from each terminal in order to broadcast them to the other terminals and transmits audiovisual frames TAVm and TAVn only to the terminals TEn and Tem, respectively, that are participating in the audioconference. More generally, if the participant working at the terminal TEn has selected a plurality of pictures IT1 to ITN of participants with whom he wishes to set up an audioconference, the server SV broadcasts audiovisual frames between the terminals participating in the audioconference inside the videoconference.

The audioconference between at least the terminals TEn and TEm may be stopped in the step A11 by a call clearing down operation simulating hanging up and initiated from one or the other of the terminals TEn and TEm. This clearing down operation is initiated by the participant canceling the selection of the picture ITm, ITn or the identifier IDm, IDn in the terminal TEn, TEm and by the central control unit UC closing the emission audio channel from the microphone MI in the audio unit UA. In the step A12, the unit UC controls the setting-up of a call releasing message containing only one video frame TVn in order for the server SV to erase the matching relationship between the identifiers IDn and IDm in the audio table for the videoconference IDG. Then, as in the initial step A0, the server SV transmits only video frames TVm, TVn to the respective terminals TEn, TEm.

The invention claimed is:

1. Videoconference system comprising:
   terminals adapted to be connected via a telecommunication network to a central videoconference management arrangement for collecting video data from participants in at least one videoconference respectively adapted to be transmitted by said terminals and for broadcasting video data transmitted by each terminal to the other terminals,
   each terminal, while functioning as a calling terminal, including a selector for selecting at least one called terminal with which an audiovisual communication is to be set up in order for said calling terminal to transmit a called terminal identifier and calling party audio data and calling party video data to said central arrangement,
   said central arrangement including an audio-video transmitter arrangement for controlling transmission between the terminals of the participants so that (a) the central arrangement is arranged to control transmission of said calling party audio data and calling party video data with said identifiers of said calling terminal and called terminal to said called terminal and (b) the central control arrangement is arranged to (i) control transmission between the calling terminal and terminals other than said calling and called terminals for transmission of calling party video data with said identifier of said calling terminal to the terminals other than said calling terminal and called terminal, and (ii) is arranged to prevent transmission of the calling party audio data to the terminals other than said calling terminal and called terminal, and
   each terminal, while functioning as a called terminal, including a controller for controlling reproduction of said calling party audio data forwarded by said central arrangement in matching relationship with said display of pictures representative of said calling party video data transmitted by said central arrangement in response to said identifiers of said calling terminal and called terminal transmitted by said central arrangement.

2. System according to claim 1, wherein each terminal, while functioning as a called terminal, comprises a transmitter for transmitting a call confirmation with an identifier of said called terminal and said called party audio and video data to said central arrangement, and said central arrangement comprises a memory for establishing a matching relationship between said identifier of said called terminal and said identifier of said calling terminal and vice-versa in order to set up bidirectional audiovisual communication between said calling terminal and called terminal.

3. System according to claim 1, wherein each terminal comprises a combiner for mixing audio data transmitted selectively by other terminals in audiovisual communication with said terminal.

4. System according to claim 1, wherein said selector of each terminal is arranged to mark on a screen of said terminal one of said picture and identifier of each participant whose terminal is in audiovisual communication with said each terminal.

5. System according to claim 4, wherein one of said picture and identifier of a participant with whose terminal audiovisual communication is to be set up from each terminal is arranged to be displayed selectively by touching said screen of said each terminal.

6. System according to claim 1, wherein each terminal comprises a main screen for displaying activity data and at least one lateral screen for viewing pictures of the participants in said videoconference.

7. System according to claim 1, wherein said lateral screen is pivotably mounted on one side of said central screen.

8. System according to claim 1, wherein each terminal is arranged to (a) transmit a videoconference identifier and (b) not transmit a destination terminal identifier if it transmits only video data to said central arrangement.

9. System according to claim 1, wherein said central arrangement is arranged to download a predetermined videoconference application into each terminal in response to a connection request message from each terminal having an address of the after and verification of said association of said address with an identifier of said videoconference in said central arrangement.

10. Central videoconference server connected to terminals via a telecommunication network in a videoconference system in which video data of participants in at least one videoconference respectively transmitted by said terminals are collected in said central server and the collected video data are broadcast to said terminals by said central server, said server including an audio-video transmitter arrangement for (a) transmitting and controlling transmission of said audio data and video data from a calling terminal which has selected at least one called terminal with which audiovisual communication is to be set up, the audio-video transmitter being arranged to transmit said audio and video data with identifiers of said calling terminal and called terminal to said called terminal, and (b) controlling transmission between said calling terminal and terminals other than said called terminal for causing (i) said calling terminal video data with said identifier of said calling terminal to be transmitted to all of said terminals other than said called terminal and calling terminal in response to said identifiers of said calling terminal and called terminal transmitted by said calling terminal, and (ii) preventing transmission of the calling party audio data to the terminals other than said calling terminal and called terminal.

11. A video-conferencing method that breaks the isolation of teleworkers by recreating relational situations between the teleworkers and other employees from the same company as if the teleworkers and other parties were conversing in the same office, the method comprising always supplying to a video display of a terminal of each person participating in the videoconference animated images of all the other participants via a central server so each person can select the image of at least one other participant with whom an audioconference, within the videoconference, is to be established, and, at the central server, controlling transmission from the central server so (a) video data from each participant is transmitted from the central server to all the other participants and (b) only audio data are transmitted between terminals of calling and called participants, the audio data being transmitted from the central server with an identifier for each participant.

12. A videoconference system comprising:
N terminals adapted to be connected to a telecommunication network, where N is an integer equal to or greater than 3, each of the terminals being arranged for transmitting and receiving signals including (a) audio and video information, and (b) an identification of one or more terminal(s) a user at one of the terminals (referred to as a calling terminal) identifies to call;

a central station arranged to receive the signal transmitted from each of the terminals, the central station including a controller arranged to be responsive to the signal transmitted from each of the terminals for (a) supplying the video information transmitted to the central station from each terminal to all the terminals of the system other than the calling terminal, (b) supplying the audio information transmitted by the calling terminal to the central station to the one or more identified terminals and enabling the one or more identified terminals to supply the audio information transmitted by them to the central station to be transmitted to the calling terminal, and (c) preventing the audio information transmitted by the calling terminal to the central station from being supplied to any of the terminals other than the one or more identified terminals.

\* \* \* \* \*